Figure 1:
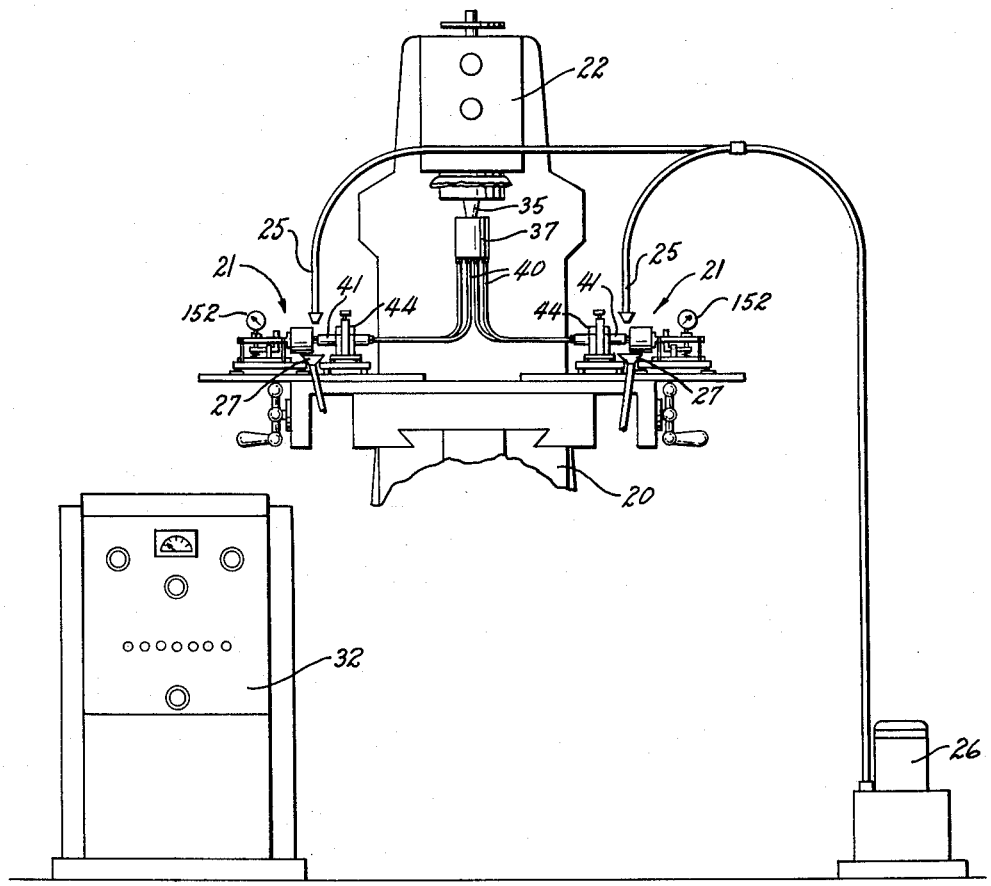

April 3, 1962 R. N. RONEY 3,027,690
ULTRASONIC MACHINE
Filed Nov. 20, 1958 7 Sheets-Sheet 1

INVENTOR.
Richard N. Roney
BY Ernest J. Hix
ATTORNEY

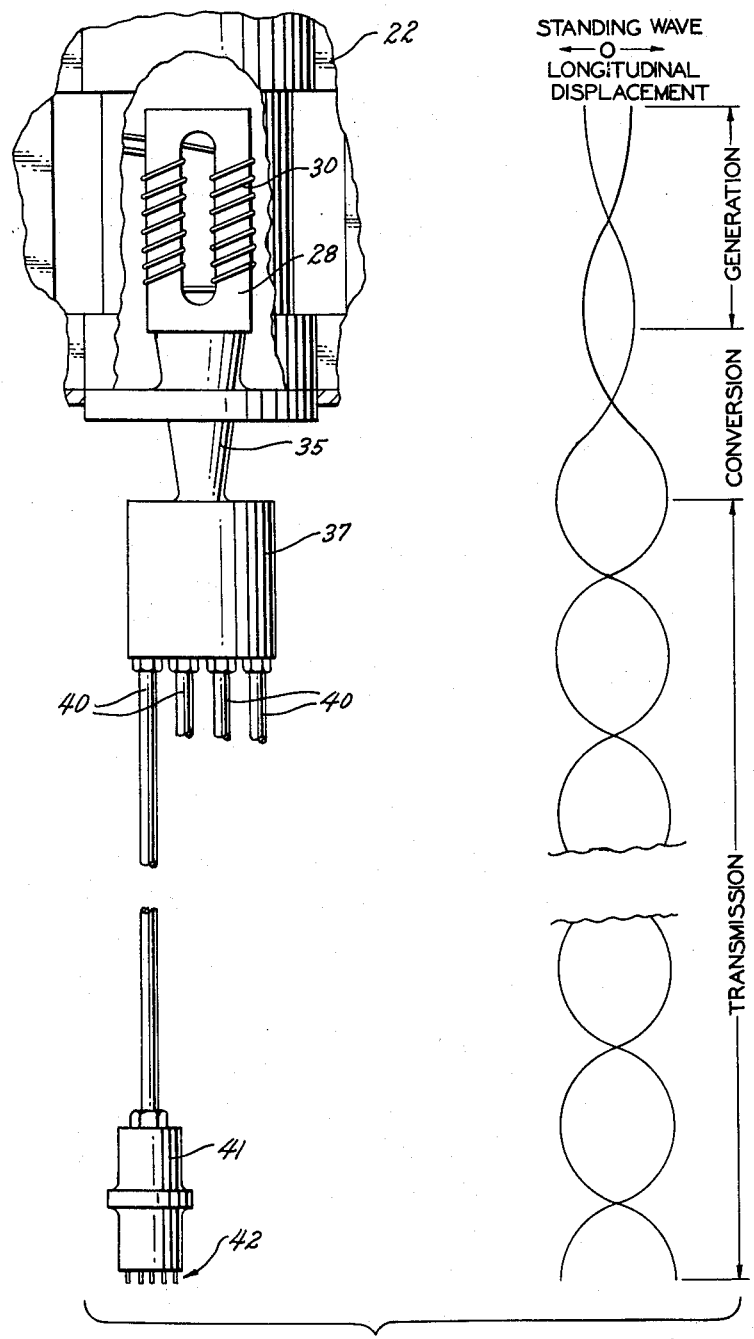

April 3, 1962

R. N. RONEY 3,027,690

ULTRASONIC MACHINE

Filed Nov. 20, 1958

7 Sheets-Sheet 3

INVENTOR.
Richard N. Roney
BY
Ernest J. Hi
ATTORNEY

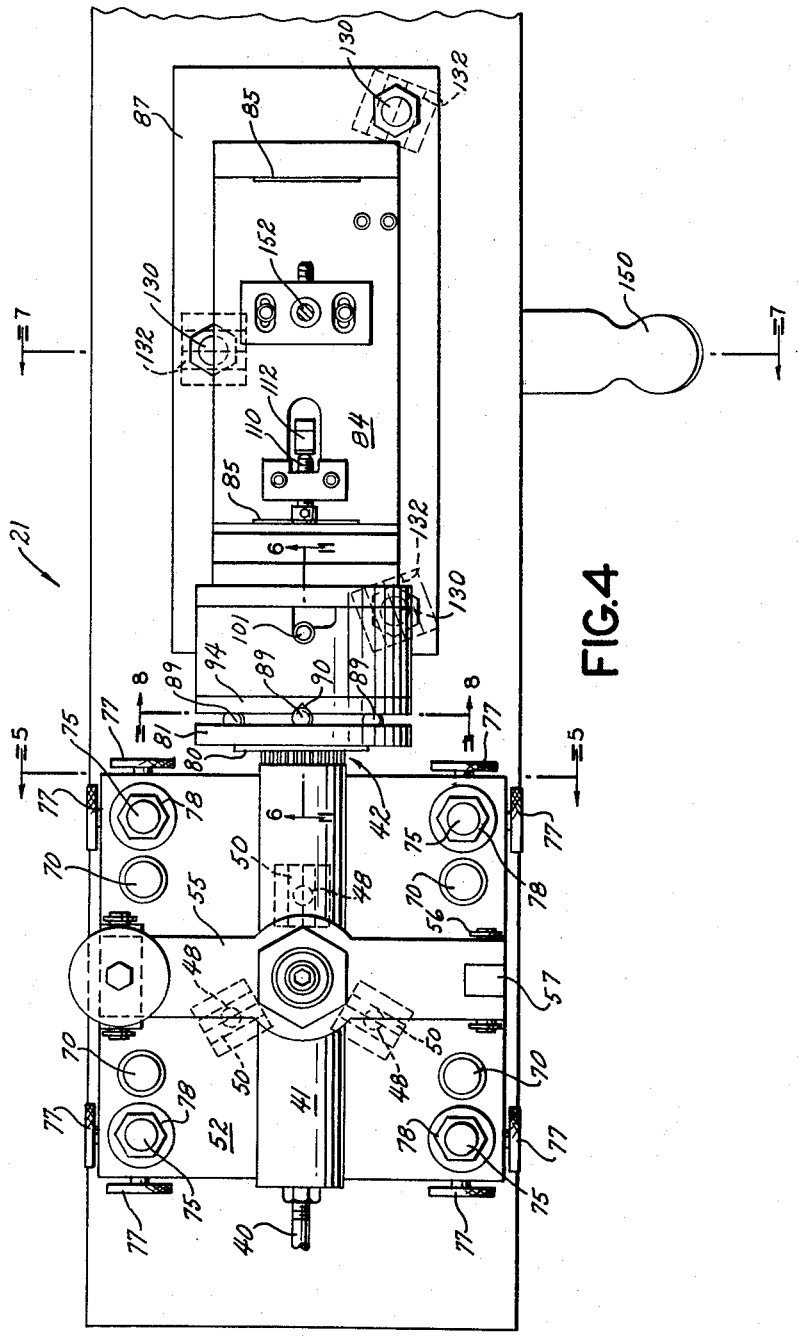

April 3, 1962 R. N. RONEY 3,027,690
ULTRASONIC MACHINE
Filed Nov. 20, 1958 7 Sheets-Sheet 5
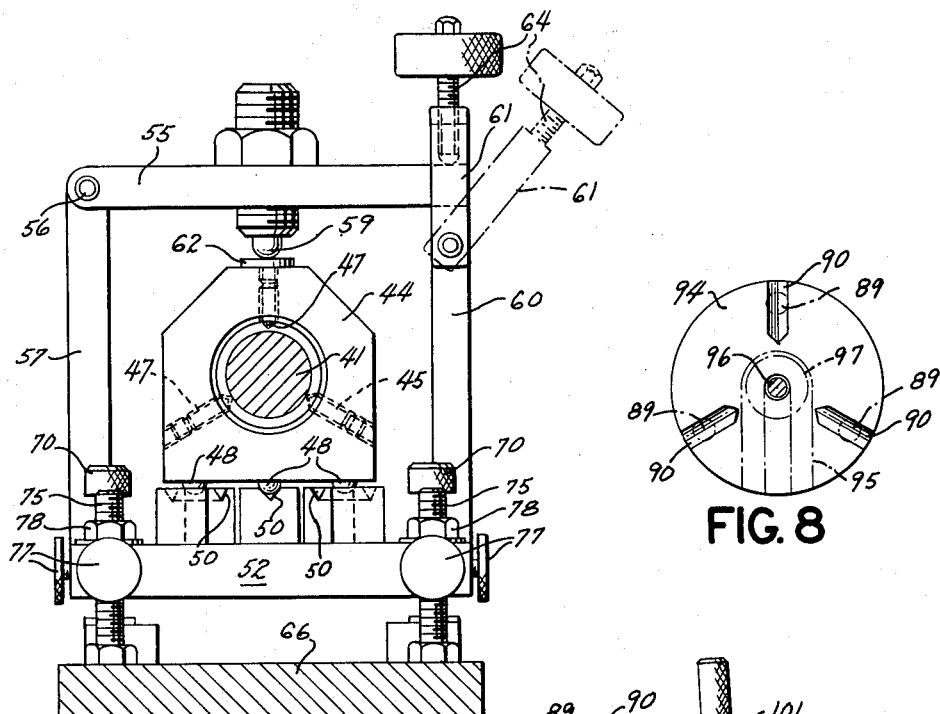
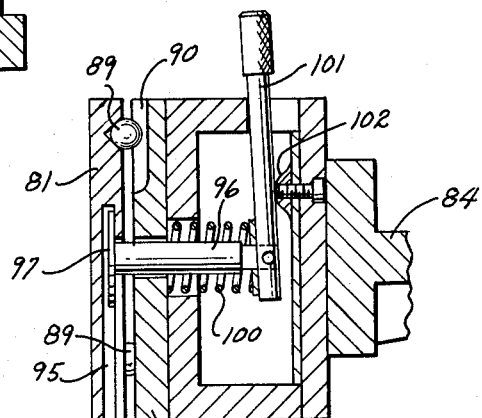
INVENTOR.
Richard N. Roney
BY
Ernest J. Hix
ATTORNEY April 3, 1962 R. N. RONEY 3,027,690
ULTRASONIC MACHINE
Filed Nov. 20, 1958 7 Sheets-Sheet 6
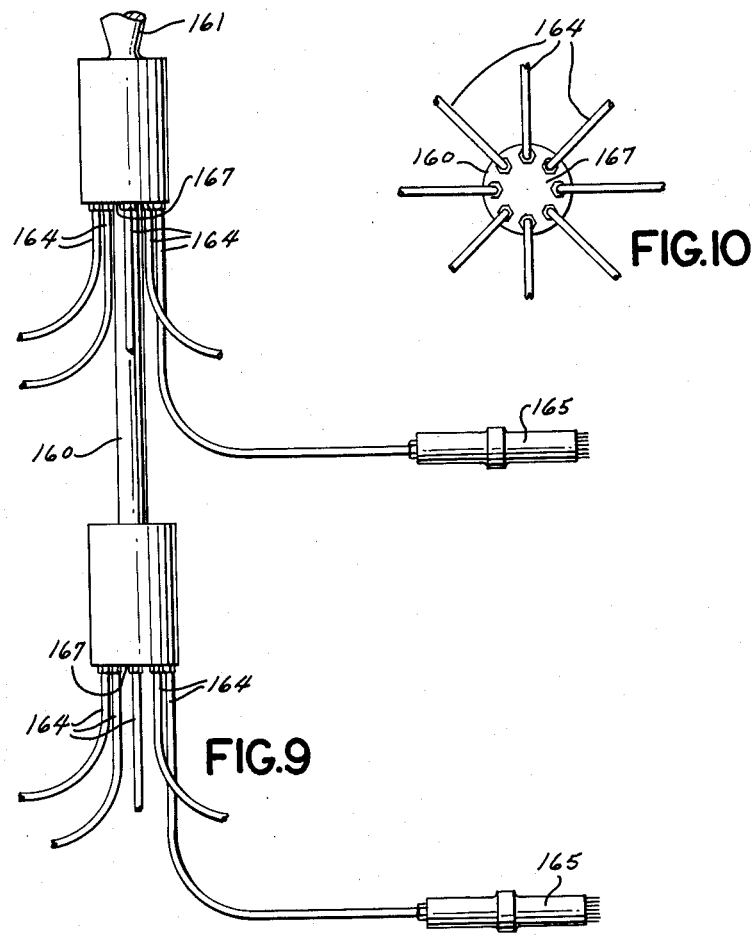
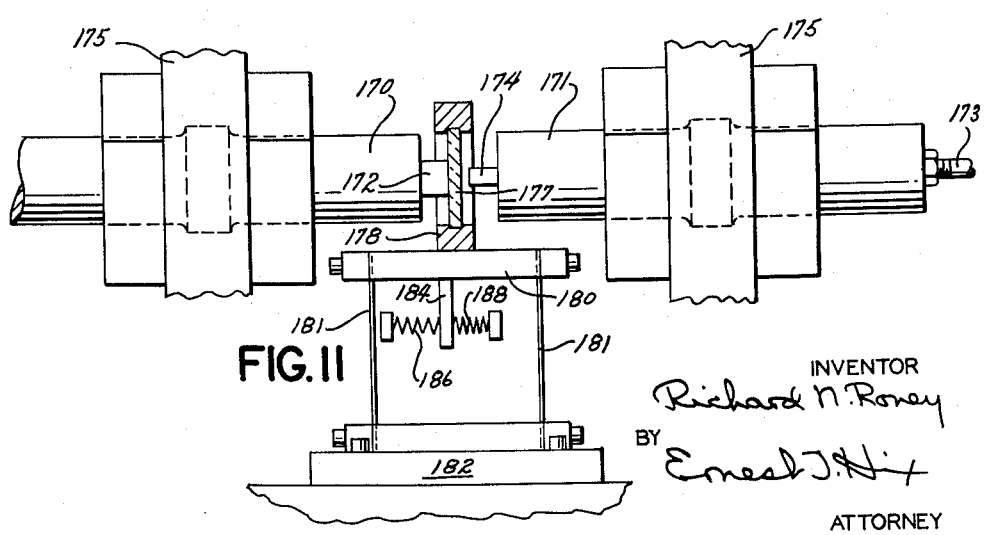
INVENTOR
Richard N. Roney
BY Ernest J. Hix
ATTORNEY April 3, 1962 R. N. RONEY 3,027,690
ULTRASONIC MACHINE
Filed Nov. 20, 1958 7 Sheets-Sheet 7

INVENTOR
Richard N. Roney
BY
Ernest J. Nix
ATTORNEY

United States Patent Office 3,027,690
Patented Apr. 3, 1962

3,027,690
ULTRASONIC MACHINE
Richard N. Roney, Dayton, Ohio, assignor to The Sheffield Corporation, Dayton, Ohio, a corporation of Delaware
Filed Nov. 20, 1958, Ser. No. 775,249
14 Claims. (Cl. 51—59)

This invention relates to ultrasonic machines and more particularly to machines for machining or treating materials through ultrasonic vibration of an energy applying tool.

In ultrasonic machines for machining or treating materials it has been common practice to utilize a single integral connecting or transmission member between each ultrasonic transducer and the energy applying tool.

In applications where an abrasive is used in conjunction with the tool for machining, the use of a single transmission member has severely limited the area possible to machine at one time. As the member between tool and transducer is increased in transverse area, radial resonant conditions are approached, with the resulting sonic wave traveling at shear velocity, and a loss of the desirable purely longitudinal mode of operation at the energy delivery or tool end of the system. Such undesirable conditions result in nodal patterns across the face of the tool support with areas having components of vibration at right angles to the desired longitudinal direction and in differing phase relationships across the tool supporting surface. Thus single transmission members of increased area ultimately result in less efficient operation, non-uniform tool motion with resulting loss in machining accuracy, and a lowering of durability due to high stress rises.

The common use of a single integral transmission member for each transducer has also limited the range and universality of application of these machines. In many instances a number of driving transducers have been required for application at spaced locations to a common tool or to separate tools.

It is an object of this invention to make possible the ultrasonic machining of large areas with efficiency and accuracy, and to materially increase the flexibility of application of ultrasonic transducers in machining or treating materials.

It is a further object of this invention to provide an ultrasonic machine having a plurality of sonically coupled transmission members for delivering ultrasonic energy from a transducer to an energy applying tool, whereby the deficiencies of an equivalent single transmission member are avoided and any necessity for plural transducers is eliminated.

It is a further object to provide an ultrasonic machine tool wherein instead of a single integral transmission member, a number of transmission members of reduced transverse cross section are connected to a common driving transducer and to toolholder means for machining a common part or a plurality of separate parts simultaneously, whereby undesirable vibratory conditions are avoided in the separate transmission members and machining energy is delivered at the optimum longitudinal vibratory conditions.

It is a further object to provide such a machine tool wherein ultrasonic energy is transmitted from a single driving transducer, through a plurality of transmission members such as rods or the like, and to individual toolholders at respective machining stations, structure being provided at each station for relatively urging the tool and work together during machining and to allow ready removal and placement of tools and work with positive reference location for repetitive machining accuracy.

It is a further object to provide such a machine tool wherein a common toolholder for extended area machining is driven with optimum vibratory conditions by means of a plurality of ultrasonic couplings such as rods or the like, each of the couplings being of reduced cross sectional area and coupled to a common transducer for energization thereby.

Figure 17:
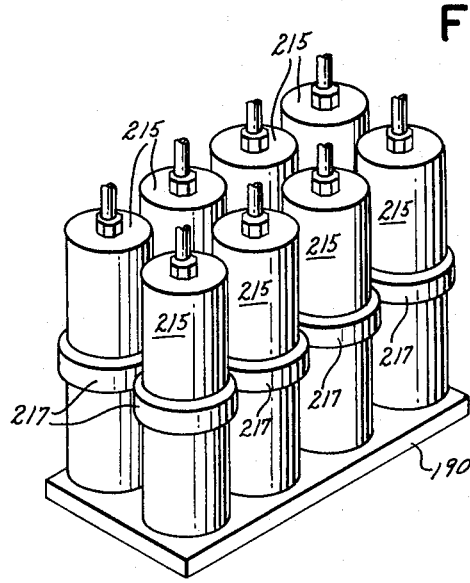
Figure 3:
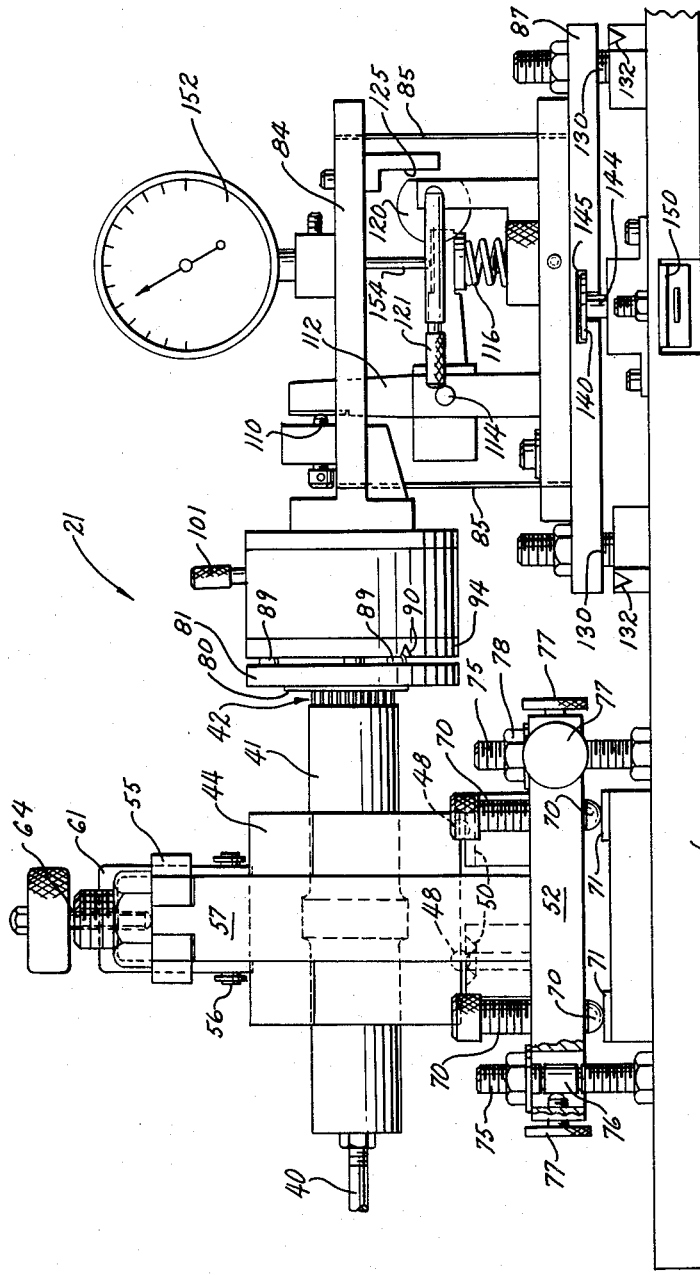
Figure 12:
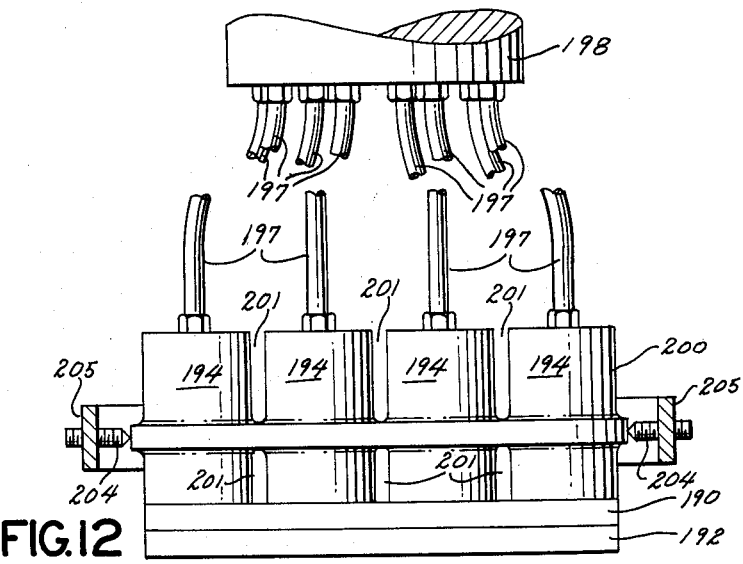
Figure 16:
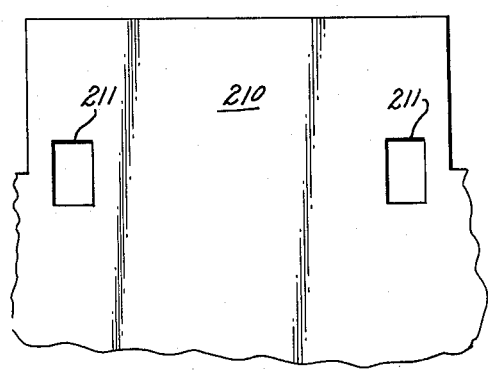
Figure 14:
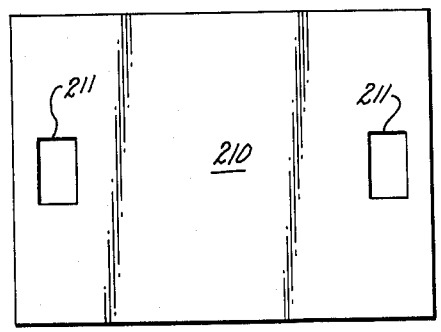
Figure 13:
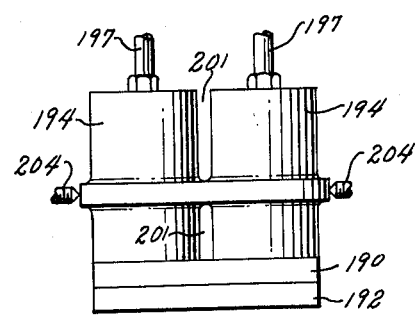
Figure 15:
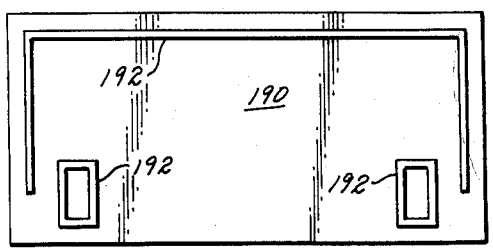

Other objects and advantages of the present invention will be apparent from the following description, the appended claims, and the accompanying drawings, in which, FIGURE 1 illustrates an exemplary machine tool embodying the present invention wherein a plurality of separate machining stations are driven from a common transducer, FIGURE 2 is an enlarged illustration of a portion of FIGURE 1 and includes a chart showing the condition of the standing wave under ultrasonic energization in this exemplary embodiment, FIGURE 3 illustrates, in elevation, one of the machining stations of FIGURE 1, FIGURE 4 is a plan view of the station of FIGURE 3, FIGURE 5 is a sectional view on line 5—5 of FIGURE 4 taken through a portion of the tool supporting structure, FIGURE 6 is a sectional view on line 6—6 of FIGURE 4 taken through the work locating and clamp arrangement, FIGURE 7 is a fragmentary sectional view on line 7—7 of FIGURE 4 showing the clamp and locating arrangement between the base and work support, FIGURE 8 is a sectional view on line 8—8 of FIGURE 4, FIGURE 9 is a modified tool driving arrangement wherein a plurality of transmission members are connected in each of a plurality of spaced planes, FIGURE 10 is a view of the lower end of the modification of FIGURE 9, FIGURE 11 illustrates an embodiment wherein opposed tools operate on a common part supported between them, FIGURE 12 illustrates, in elevation, an embodiment wherein a plurality of transmission members are sonically coupled to a common tool, which in this application is applied to machining a workpiece simultaneously over a substantial extended area, FIGURE 13 is an end view of the tool driving structure of FIGURE 12, FIGURE 14 illustrates an exemplary part which requires machining over an extended area, FIGURE 15 illustrates a tool arrangement for use with the tool driving structure of FIGURE 12 and application to the part of FIGURE 14, FIGURE 16 shows an exemplary part partially formed with the tool of FIGURE 15, and FIGURE 17 is a fragmentary perspective view of an alternative tool driving arrangement similar to that of FIGURE 12.

In the present invention a plurality of members for transmitting ultrasonic energy are sonically coupled to a single transducer. As illustrated, the transmission members or rods are sonically coupled at one end to the transducer and at their other ends to toolholder or other energy applying means.

When the plurality of transmission members are connected to single toolholders for use in machining larger areas the difficulties inherent in using a single large area transmitting member are avoided. A more uniform phase relationship is obtained across the face of the large tool support, and objectionable, accuracy-destroying transverse tool movements are avoided.

The field of application of ultrasonic wave energy is materially broadened in an economical and efficient manner through the present invention. Energy from a common transducer can be applied with great flexibility. It is possible, for example, to simultaneously drive from a single transducer a plurality of machining stations where work and tool are guided and urged together during the machining operation. Opposing tools can be readily applied to a common part. The term tool is used herein to designate the ultrasonic energy applying portion of a resonant system for treating or machining materials. While illustrated as applied to machining the present invention is not limited to such applications.

Referring more particularly to the drawings, FIGURE 1 illustrates a machine tool including the present invention. This machine includes a base 20 supporting a plurality of machining stations 21, each having forming tools driven ultrasonically from a common transducer housed in toolhead 22.

As the work and tool are yieldingly urged together during machining at each of the stations an abrasive slurry is provided through conduits 25. The slurry is conducted away and returned to pump 26 through receivers 27.

As shown in FIGURE 2 the exemplary transducer 28 is of a magnetostrictive type energized for ultrasonic elongation and contraction along its longitudinal axis by windings 30 energized from a generator 32. A motion amplifying member 35 of tapered conical configuration is connected to transducer 28 at one end and in turn has a cylindrical connection member 37 sonically coupled to it. Thus, as indicated in the diagram to the right in FIGURE 2, an ultrasonic standing wave is generated in transducer 28, converted in amplitude through member 35 and transmitted through connection member 37. The resonant system from transducer 28 to and including the tool is, of course, an integral number of half-wave lengths in length at the driving frequency.

In this exemplary embodiment of the present invention a plurality of transmission rods 40 are sonically coupled to the lower end of connection member 37 in a common plane. Note in FIGURE 1 that the lower ends of rods 40 relatively diverge outwardly. Each of these rods is preferably, although not necessarily, a solid, round rod of a suitable acoustical material such as steel. Toolholders 41 are sonically coupled to rods 40 at their lower ends and carry tools 42 for operations as desired. These toolholders, as will be noted, are of substantially larger transverse dimension than the rods 40 so that a tool assembly of substantial size may be employed. Each of rods 40 and its associated toolholder 41 form, with connection member 37, conversion member 35, and transducer 28, an ultrasonically resonant system. Preferably rods 40 have lengths equaling an integral number of half-wave lengths and are coupled at their upper and lower ends at antinodal locations of the overall system.

Station 21 is illustrated in more detail in FIGURES 3 and 4. Each station 21 includes supporting means guiding and urging the tool and workpiece for relative movement toward one another along the longitudinal axis of the toolholder. A mount 44, rigidly secured to each respective toolholder 41 at a central nodal location of the toolholder-tool assembly through set screws 47 (see FIGURE 5), has three equally spaced locating balls 48 fixed to its lower surface. Each toolholder unit, including toolholder 41, mount 44, locating balls 48, and tool means 42 is precisely machined and assembled through a jig arrangement so that tool locations are precisely referenced on the locating balls 48 in each instance.

Locating balls 48 of the toolholder unit engage cooperating grooves 50 provided on an intermediate support 52. Thus when the assembly is placed on intermediate mount 52 the assembly and mount are precisely located in all degrees of freedom relative to one another through engagement of balls 48 with grooves 50.

Clamping structure is provided for holding the toolholder unit on support 52. A clamping arm 55 pivoted at 56 to a bar 57 extending upward from support 52 has a clamping contact 59 for engagement with an opposed abutment 62 on the upper face of mount 44. A second bar 60 pivotally carries a U-shaped clamping jaw 61 which can be swung to and from clamping position. As seen in FIGURE 5, with screw 64 tightened the assembly is rigidly connected together. Through release of screw 64 and pivoting of jaw 61 to the right the assembly is then unclamped.

Intermediate support 52 is in turn carried from base plate 66 through adjustable structure for positioning the toolholder unit in all possible degrees of freedom to obtain a reference disposition of tool means 42 relative to the work. As shown, this adjustable structure includes screws 70 cooperating at their lower ends with opposing pads 71 on base 66. Through rotation of screws 70, support 52 and the structure which it carries can be vertically adjusted and rotationally positioned as desired.

Locating studs 75 threaded into base 66 at their lower ends have unthreaded portions 76 (see FIGURE 3) extending with clearance through support 52 at each of its corners. The cylindrical portion of each stud 75 is engaged by a cooperating pair of adjustable set screws 77 at each corner of support 52. Through cooperative adjustment of set screws 77, the position of mount 52 is precisely and rigidly determined in a horizontal plane through a range of adjustment allowed by the clearance between each cylindrical portion 76 and the surrounding passage through support 52. Following this, adjustment nuts 78 on studs 75 are firmly clamped down to maintain contacts 70 in firm engagement with pads 71. Thus the entire toolholder assembly is universally adjustable and clamped rigidly in its adjusted position.

In this exemplary application the work 80 to be machined is cemented or otherwise fixed to a work carrying plate 81 located and clamped to bar 84 mounted on flexible leaves 85. Leaves 85 are in turn connected at their lower ends to support 87 located and releasably clamped on base 66.

Work mounting plate 81 has three balls 89 fixed to its inner surface and cooperating with grooves 90 for positive location of work 80. Grooves 90 are provided in the forward face of a reference plate 94 fixed to bar 84. Work plate 81 is precisely located and referenced on the forward face of locating plate 94 through the interengagement of balls 89 with the three radial grooves 90. Releasable clamp means are provided for plate 81. This arrangement includes a vertical T-shaped groove 95 in the lower portion of plate 81 (see particularly FIGURE 6). A clamping head 97 on a clamping pin 96 is resiliently urged toward clamping position by means of spring 100. A release lever 101 can be pivoted in a clockwise direction as seen in FIGURE 6 about a pivoting abutment 102 to extend head 97 to the left to an extent to allow balls 89 to clear grooves 90 so that plate 81 can be lifted vertically from the clamping position to remove the work which it supports from the machining station.

Through this arrangement a work plate 81 can be removed and replaced with positive assurance that it is repetitively situated at the same location. Similarly, if identical plates and work mounts are utilized plates can be sequentially placed in forming position with reference locations.

Bar 84 is urged to the left as seen in FIGURE 3 by means of a bell crank 112 pivoted at 114 on support 87. The bell crank has an upper arm engaging an abutment 110 on bar 84 and a spring 116 contacts the lower arm of the bell crank to urge the work resiliently toward tool means 42 as it is guided through leaf springs 85. Due to the fact that ordinarily working or machining depth is small the guided movement of work 80 is for all practical purposes rectilinear along the axis of toolholder 41.

As machining progresses a dial indicator 152 mounted on bar 84 is actuated through engagement of its stylus 154 with the lower bell crank arm so that the machining depth is indicated.

A circular cam 120 having one flat side is pivoted on support 87 and actuated through a lever 121 for engagement with an abutment 125 on bar 84. Through pivoting of lever 121 in a clockwise direction as seen in FIGURE 3 cam 120 will be brought into engagement with abutment 125 to retract and lock the workholding assembly in a rearward position.

For reference location of the entire work supporting assembly three locating contacts 130 are provided at the lower surface of plate 87. These contacts engage grooves 132 on base 66 to positively locate the workholding assembly in all degrees of freedom.

A clamping arrangement is provided between support 87 and base 66 which operates in a manner similar to that of the structure which clamps work plate 81 to locating plate 94. A T-shaped groove 145 extends outward in the lower surface of support 87. This groove is engaged by a clamping head 140 at the upper end of a clamping pin 144 urged downward by spring 145 to maintain contacts 130 firmly in engagement with grooves 132 to locate and clamp the workholding and supporting assembly in a reference position. A release lever 150 is provided which can be pivoted to move pin 144 upward so that the entire work supporting assembly is released for removal. Through this arrangement the entire assembly, or separate assemblies similarly constructed, can be removed and placed on base 66 with assurance that they are positively located in reference positions.

As previously mentioned, the toolholder unit including toolholder 41 and mount 44 is precisely manufactured so that the tool means 41 and the end face of mount 44 are referenced with respect to locating balls 48. Similarly the work is mounted on plate 81 by reference to balls 89. This structure has material importance where it is necessary to perform sequential machining operations on a common workpiece with precise registry or reference between the operations. By using suitable gaging means located in grooves 90 of the work supporting structure and measuring against the reference end face of the mount 44, the adjustments provided for support 52 can be utilized so that the toolholding and workholding assemblies are precisely disposed in a reference relationship. With this accomplished, toolholder assemblies or units can be removed and replaced in a common station or between a plurality of stations. Similarly work supporting plates 81 can be employed.

In FIGURES 9 and 10 a further embodiment of the present invention is shown. In this embodiment a motion transmission assembly 160 is connected to the lower end of a conversion member 161. As shown, a plurality of transmission rods 164 are connected sonically to assembly 160 in each of parallel antinodal planes 167 of the longitudinal wave system. Rods 164 each have a toolholder 165 sonically connected to it at its lower end as in the previous embodiment discussed. Through this arrangement an extremely large number of transmission members can be employed for applications as desired.

In FIGURE 11 a pair of opposed toolholders 170 and 171 respectively support exemplary tools 172 and 174. Toolholders 170 and 171 are connected through transmission rods such as indicated at 173 with a common transducer in a manner similar to the modifications previously discussed. Each toolholder can be supported in this application through supporting structure indicated at 175 and similar to that of FIGURES 4 and 5. The workpiece itself 177 is carried in a fixture 178 and is exposed on both sides for operation upon it by both tools 172 and 174. A support for fixture 178 is schematically shown. It includes a plate 180 mounted on leaf springs 181 from a base 182. Plate 180 has a downward abutment 184 against which springs 186 and 188 can be alternatively applied so that workpiece 177 can be resiliently urged against either tool 172 or tool 174 during a machining operation.

Through yielding mounting of the toolholders rather than the work the workpiece could be simultaneously machined from opposite directions in a manner which will be readily apparent.

As previously discussed the present invention has particular advantage when it is desired to machine over an extended area. FIGURES 12 and 13 illustrate an embodiment of the present invention employing this particular approach. In the exemplary units illustrated a tool support 190 carrying tool means 192 at one face has a plurality of toolholders 194 sonically coupled to it at its opposite face. Each of toolholders 194 is in turn sonically coupled through a transmission rod 197 with a common connection member 198 driven ultrasonically. Suitable coupling means are provided at each end of rods 197 to sonically couple the rods to connection member 198 and toolholders 194. These may include oppositely threaded connecting elements such as are used in turnbuckle arrangements. Through rotation of these elements at each end of the rods the rods would be drawn into respective engagement with the connecting member 198 and toolholders 194.

As shown, toolholders 194 are formed in an integral block 200 which has grooves 201 extending inward in its opposite faces substantially to a nodal plane of the tool assembly. Toolholders 194 can be substantially square in section or round as shown. The block 200 is supported in this plane through engagement of point contacts 204 carried from support structure 205. Thus as toolholders 194 are ultrasonically driven, the tool supporting face of tool support 190 is ultrasonically vibrated in a uniform manner and uniform phase relationship, driving tool 192 for the most accurate and efficient forming operations. As in the previous embodiment discussed, rods 197 and toolholders 194 form parts of similar ultrasonically resonant systems. In this example each of coupling rods 197 is an integral number of half-wave lengths in length. From the lower rod coupling to the tool tip is another effective half-wave length in each of the resonant systems.

An exemplary part 210 is shown in FIGURE 14. It is assumed to have an extended overall dimension, perhaps of several inches, impossible or impractical to machine at one time with present known approaches using a single connecting body. An exemplary tool configuration which could be employed for machining this part is shown in FIGURE 15. With this tool the outer periphery of the part is partially machined in each of two sequential operations. The inner holes 211 of this part are machined in the first operation and in the second operation they serve as pilots in cooperation with their respective tool portions so that the sequential forming operations on the outer periphery are done with precise registry. FIGURE 16 illustrates the part after the first forming operation. Through application of the present invention in simultaneously driving extended areas of a tool support large area forming such as in extended sections of ceramics can be done readily.

While the toolholders 194 in the embodiment of FIGURES 12 and 13 are included in an integral block, FIGURE 17 illustrates separate substantially cylindrical members 215 sonically-mounted on a common tool support 190. In this instance toolholders 215 would be supported at their nodal flanges 217.

Thus it is seen that a unique driving and transmission arrangement has been provided for ultrasonic machines. It makes possible machining operations over more extended areas than can be accomplished with known ultrasonic machine tools using an integral enlarged single connecting member. Similarly through the flexibility achieved by the multiple connections from a single transducer many operations can be performed not previously possible or practical with only one driving transducer. The locating and clamping arrangement makes possible precise registry of both tool and work for precision sequential machining operations on a common part.

While the forms of apparatus herein described constitute preferred embodiments at the invention, it is to be understood that the invention is not limited to these precise forms of apparatus, and that changes may be made therein without departing from the scope of the invention which is defined in the appended claims.

What is claimed is:

1. An ultrasonic machine tool for machining materials through ultrasonic tool vibration at minute amplitudes during application to a workpiece in conjunction with an abrasive, said machine tool comprising a driving transducer adapted to be excited for elongation and contraction along its longitudinal axis at ultrasonic frequencies, a connection member sonically coupled to said transducer as a continuation of the longitudinal axis thereof, a plurality of motion transmission members sonically coupled at their inner ends to said connection member, each of said transmission members being of elongated rod-like form and forming with said transducer and connection member a portion of an ultrasonically resonant system, said members having relatively diverging portions along their lengths, tool means in each system at the outer end of each respective transmission member, support means for said tool means, work support means, and means yieldingly and resiliently urging said support means toward one another during a machining operation, the direction of ultrasonic vibration of each of said tool means being transverse the axis of said transducer.

2. An ultrasonic machine tool for machining materials through ultrasonic tool vibration at minute amplitudes during application to a workpiece in conjunction with an abrasive, said machine tool comprising a driving transducer adapted to be excited for elongation and contraction along its longitudinal axis at ultrasonic frequencies, a shaped amplitude conversion member sonically coupled to said transducer as a continuation of the longitudinal axis thereof, a plurality of motion transmission members of uniform cross-section sonically coupled at their inner ends to said conversion member in a common plane and having relatively diverging portions along their lengths, each of said transmission members having a length equalling an integral number of half-wave lengths and forming with said transducer and conversion member a portion of an ultrasonic resonant system, a plurality of toolholders, one sonically coupled to the outer end of each respective transmission member, a separate workholder for each toolholder, means yieldingly and resiliently urging each cooperating toolholder and workholder together during a machining operation, and means mounting each toolholder and each cooperating workholder with the axis of relative movement therebetween transverse the axis of said transducer.

3. An ultrasonic machine tool for machining materials through ultrasonic tool vibration at minute amplitudes during application to a workpiece in conjunction with an abrasive, said machine tool comprising a magnetostrictive driving transducer adapted to be excited for elongation and contraction along its longitudinal axis at ultrasonic frequencies, a shaped amplitude conversion member sonically coupled to said transducer as a continuation of the longitudinal axis thereof, a plurality of motion transmission rods sonically coupled at their inner ends to said conversion member in a common plane and having relatively diverging portions along their lengths, each of said transmission rods having a length equalling an integral number of half-wave lengths and forming with said transducer and conversion member a portion of an ultrasonically resonant system, a plurality of toolholders, each toolholder and tool assembly being an integral number of half-waves in overall length and of larger transverse dimension than said transmission rods, means sonically coupling one of said toolholders to the outer end of each respective transmission rod, support means connected to each of said toolholders at a central nodal location therealong, work support means, and means yieldingly urging said support means toward one another during a machining operation.

4. An ultrasonic machine tool for machining materials through ultrasonic tool vibration at minute amplitudes during application to a workpiece in conjunction with an abrasive, said machine tool comprising a driving transducer adapted to be excited for elongation and contraction along its longitudinal axis at ultrasonic frequencies, a base, means mounting said transducer on said base, a shaped amplitude conversion member sonically coupled to said transducer as a continuation of the longitudinal axis thereof, a plurality of motion transmission rods sonically coupled at their inner ends to said conversion member in a common plane and having at least portions thereof relatively diverging, each of said transmission rods having a length equalling an integral number of half-wave lengths and forming with said transducer and conversion member a portion of an ultrasonically resonant system, a plurality of toolholders, one sonically coupled to the outer end of each of said respective transmission rods, a separate workholder for each of said toolholders, each of said workholders including means for supporting and locating a workpiece, guide means carrying said workholder on said base for movement along the axis of the respective one of said toolholders, resilient means cooperating between said base and said workholder for urging a workpiece carried thereby toward the respective toolholder, and actuating means for retracting said workholder against the urging of said resilient means.

5. An ultrasonic machine tool as set forth in claim 4 wherein said guide means includes parallel leaf springs supporting and guiding said workholder for movement along the axis of the respective toolholder.

6. An ultrasonic machine tool for machining materials through ultrasonic tool vibration at minute amplitudes during application to a workpiece in conjunction with an abrasive, including a base, a driving transducer mounted on said base and adapted to be excited for elongation and contraction along its longitudinal axis at ultrasonic frequencies, a shaped amplitude conversion member sonically coupled to said transducer as a continuation of the longitudinal axis thereof, a plurality of motion transmission members sonically coupled at their inner ends to said conversion member in a common plane, each of said transmission members having a length equalling an integral number of half-wave lengths and forming with said transducer and conversion member a portion of an ultrasonically resonant system, a plurality of toolholders, one sonically coupled to the outer end of each of said respective transmission members, a mount for each toolholders coupled therewith to form a toolholder unit, a separate workholder for each of said toolholders, means supporting and yieldingly urging each cooperating toolholder unit and workholder together during a machining operation, each of said supporting means including releasable clamps for detachably fixing the respective toolholder unit and workholder on said base, and locating means cooperating between said base and both said toolholder unit and said workholder for ready removal and placement to precise reference positions on said base and relative to one another.

7. An ultrasonic machine tool as set forth in claim 6 wherein the supporting means for each of said toolholder units includes an intermediate mount between said unit and said base, adjustable positioning means cooperating between said mount and said base, reference locating means cooperating between said unit and said intermediate mount, and releasable clamp means between said unit and said mount for holding the unit in a reference position determined by said locating means.

8. An ultrasonic machine tool as set forth in claim 7 wherein said locating means co-operating between said unit and said intermediate mount comprises relatively spaced grooves on one and cooperating ball contacts fixed to the other, said balls and groove engaging to determine the position of said unit on said intermediate mount in all degrees of possible movement.

9. An ultrasonic machine tool as set forth in claim 6 wherein each of said workholders includes a work mounting plate, a carrier for resiliently supporting and guiding the respective plate, locating means and releasable clamp means between said plate and said carrier, further locating means between said carrier and said base, and releasable clamp means for fixing said carrier to said base, whereby supported components are readily removable and replaceable to precise reference positions.

10. An ultrasonic machine tool for machining materials through ultrasonic tool vibration at minute amplitudes during application to a workpiece in conjunction with an abrasive, said machine tool including a base, a driving transducer adapted to be excited for elongation and contraction along its longitudinal axis and ultrasonic frequencies, a connection member sonically coupled to said transducer as a continuation of the longitudinal axis thereof, a pair of elongated motion transmitting rods sonically coupled at their inner ends to said conversion member in a common plane, each of said transmission rods having a length equalling an integral number of half-wave lengths and forming with said member and transducer an ultrasonically resonant system, a toolholder for each of said rods, each of said toolholders having a tool at one end and being sonically coupled at its other end to a respective one of said transmission rods, means mounting said toolholders in parallel relationship on said base and disposing the respective tools in opposition, and a workholder on said base supported between said tools for operative association therewith.

11. An ultrasonic machine tool as set forth in claim 10 including means mounting said workholder on said base for movement along the axis of said aligned toolholders, said mounting means including resilient means selectively operable to urge the workholder in opposite directions for alternative association with said opposed tools.

12. An ultrasonic machine tool for machining materials through ultrasonic tool vibration at minute amplitudes during application to a workpiece in conjunction with an abrasive, said machine tool including a base, a driving transducer adapted to be excited for elongation and contraction along its longitudinal axis at ultrasonic frequences, a shaped amplitude conversion member sonically coupled to said transducer as a continuation of the longitudinal axis thereof, an extended connecting body mounted coaxially on said conversion member, a plurality of individual motion transmission members sonically coupled to said connecting body at their inner ends in each of a plurality of relatively spaced parallel planes transverse the axis of said transducer, each of said transmission members forming with said transducer and connecting body a portion of an ultrasonically resonant system, a plurality of toolholders, one sonically coupled to the outer end of each respective transmission member, support means for said toolholders, work support means, and means on said base mounting both said support means for relatively urging a workpiece and its associated tool together during a machining operation.

13. An ultrasonic machine tool for machining a workpiece over an extended area through ultrasonic vibration of a forming tool at minute amplitudes during application of the tool to the workpiece in conjunction with an abrasive, said machine tool including a base, a driving transducer adapted to be excited for elongation and contraction along its longitudinal axis at ultrasonic frequencies, a connecting member sonically coupled to said transducer as a continuation of the longitudinal axis thereof, a plurality of motion transmission rods of uniform cross-section detachably and sonically coupled at their inner ends to said connecting member, each of said transmission rods being an integral number of half-waves in length and forming with said transducer and connecting member a portion of an ultrasonically resonant system, a plurality of toolholders, a unitary support, means sonically and detachably coupling said toolholders in symmetrical disposition to a common side of said tool support for applying ultrasonic energy thereto, at relatively spaced locations thereacross, said support having tool means at its opposite side for application to the work, the opposite end faces of each of said toolholders being sonically coupled to a respective one of said transmission rods, a workholder, and means supporting said tool means and said workholder for relative movement along the line of machining.

14. An ultrasonic machine tool as set forth in claim 13 including a toolholder unit sonically coupled to said tool support to form a tool assembly, said toolholder unit having grooves in its end faces extending substantially inward to a central nodal plane of the assembly and dividing the unit into similar toolholder sections, the end face of each of said toolholder sections remote from said tool means being sonically coupled to the outer end of a respective one of said transmission rods, and support means mounting said assembly through engagement with the unit in said nodal plane.

References Cited in the file of this patent

UNITED STATES PATENTS

| | | |
|---|---|---|
| 2,580,716 | Balamuth | Jan. 1, 1952 |
| 2,680,333 | Calosi | June 8, 1954 |
| 2,723,386 | Camp | Nov. 8, 1955 |
| 2,736,144 | Thatcher | Feb. 28, 1956 |
| 2,813,377 | Duran | Nov. 19, 1957 |
| 2,825,186 | Palush | Mar. 4, 1958 |
| 2,858,652 | Luthman et al. | Nov. 4, 1958 |
| 2,893,271 | Elledge | July 7, 1959 |

FOREIGN PATENTS

| | | |
|---|---|---|
| 965,199 | France | Feb. 15, 1950 |